Sept. 30, 1924.
C. J. THOMPSON ET AL
1,509,850
METHOD OF AND APPARATUS FOR REFRIGERATING COMESTIBLES
Filed June 8, 1922
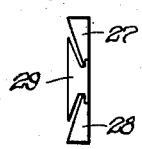
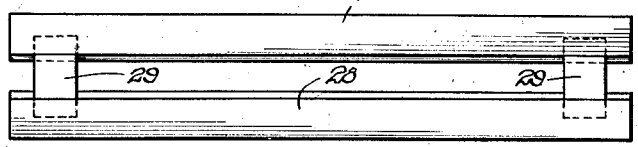
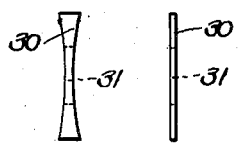
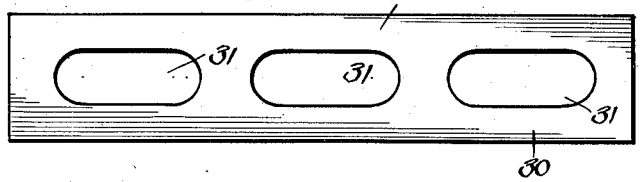
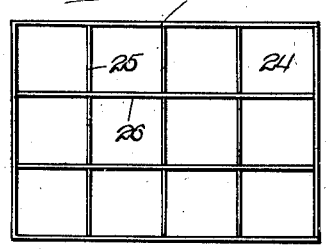
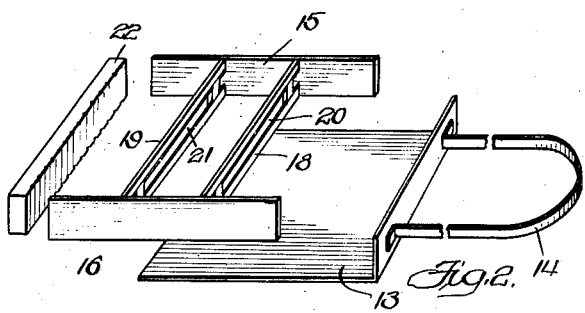
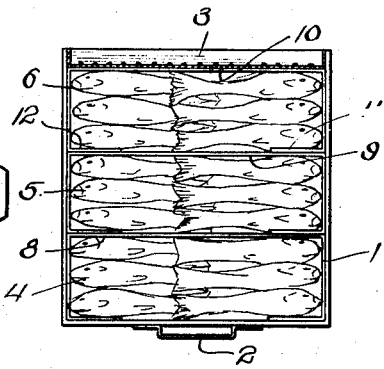
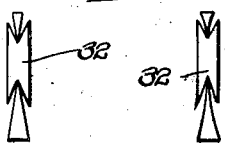
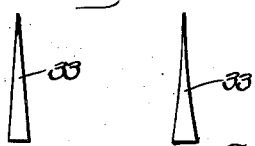
Witness:
Geo. W. Hansen
Inventors:
PAUL W. PETERSEN
CLIFFORD J. THOMPSON
By Jones, Addington, Ames & Seibold
Attys Patented Sept. 30, 1924.

1,509,850

UNITED STATES PATENT OFFICE.

CLIFFORD J. THOMPSON AND PAUL W. PETERSEN, OF CHICAGO, ILLINOIS; SAID THOMPSON ASSIGNOR TO SAID PETERSEN.

METHOD OF AND APPARATUS FOR REFRIGERATING COMESTIBLES.

Application filed June 8, 1922. Serial No. 566,894.

*To all whom it may concern:*

Be it known that we, CLIFFORD J. THOMPSON, a citizen of the United States, and PAUL W. PETERSEN, a subject of the King of Denmark, residents of Chicago, in the county of Cook and State of Illinois, have invented certain new and useful Improvements in Methods of and Apparatus for Refrigerating Comestibles, of which the following is a full, clear, concise, and exact description, reference being had to the accompanying drawings, forming a part of this specification.

Our invention relates to a method of handling comestibles for refrigerating them and to the resultant frozen mold comprising the comestibles that are to be thusly preserved by means of refrigeration.

More particularly our invention relates to a method of handling comestibles, such as fruits, fish, meats, fowl and the like for refrigerating them en masse into frozen molds whereby a refrigerated mold, on being removed from the freezing holder, may be readily sub-divided into conveniently sized frozen packs or cakes without bruising or scarring or mutilating the comestibles comprised in the refrigerated mold.

Our present invention is directed particularly to refrigerated comestibles that are tightly packed in suitable containers for freezing the comestibles en masse into molds of sufficient size to render the storage and handling of them economical, such molds being capable of subdivision into smaller sized packs or cakes of regular formation when it is desired to market the comestibles in the form of relatively small sized molds.

For a more complete description of one method of handling and refrigerating comestibles that may be adapted for the practicing of the present invention, reference may be had to Patent Reissue Number 15,683 of September 4th, 1923, the original application of which was filed October 12th, 1921.

Heretofore it was not practicable to subdivide, along predetermined lines, separate frozen molds into small-sized regularly formed packs or cakes. Whenever it was desired to subdivide one of these frozen molds, it was necessary either to break the mold into irregular pieces by means of mechanical force or to cut the molds into pieces or to thaw the mold and then subdivide the comestibles contained therein into such portions as were desired. These methods of subdividing a frozen mold of comestibles are very unsatisfactory since the comestibles becomes unnecessarily thawed out, bruised or broken and the subdivided cakes are irregular in form thus imparting to the refrigerated comestibles a very unsatisfactory appearance.

By means of our present invention, we are able to conveniently and readily pack comestibles into containers wherein the comestibles are to be frozen en masse into a single subdivisible mold. After refrigeration, the comestibles may be handled either in this single frozen mold or the frozen mold may be subdivided into regularly formed packs or cakes wherein the comestibles are maintained intact and possess a highly satisfactory appearance rendering them readily marketable. By means of our invention, we are capable also of readily handling comestibles and packing them into separate groups to fit into containers of such standard and predetermined form that the comestibles will be readily accepted by the trade.

For a better understanding of the nature and scope of our invention, reference may be had to the following description and the accompanying drawing, in which—

Figure 1 is a plan view of a container packed in accordance with our invention whereby comestibles, such as fish may be frozen en masse into a single mold which, on being extracted from the container, may be readily partitioned into a plurality of regularly formed cakes;

Fig. 2 is a view of a scoop-shaped device showing a frame-work partition that is useful in handling and packing comestibles that subsequently are to be contained in a vertically disposed container wherein they are to be frozen en masse into a subdivisible mold comprising in situ the frame-work partition;

Fig. 3 is a plan view of a modified form of partitioning frame-work that is especially adapted to receive comestibles that, after having been refrigerated, are to be subdivided into relatively small packs or cakes;

Fig. 4 is an elevational view showing a portion of the partitioning structure of Fig. 2;

Fig. 5 is an end view of the partition of Fig. 4 illustrating the shape of the longitudinal strips as well as the spacers;

Fig. 6 is a view showing a modified form of a partitioning strip;

Fig. 7 illustrates one of the cross-sectional forms that the strips of Fig. 6 may assume and similarly Fig. 8;

Fig. 9 is an end view of a modified partitioning structure similar to that shown in Fig. 4 and having the bottom section expanded to provide a tapering receptacle that permits of the ready insertion and withdrawal of baskets and the like in which comestibles may be received and packed before inserting them into the refrigerating holders or containers;

Fig. 10 is a view similar to that of Fig. 9 showing a modified form of partitioning strip that may serve the same purposes as those of Fig. 9; and Fig. 11 is a modified form of a partitioning strip that may be embodied in our molds.

Referring to Fig. 1, we have shown the comestibles, such as fish, arranged in a scoop-shaped container 1 which is provided with a handle 2 and a removable false end portion 3. The fish are shown as being packed regularly and tightly within the scoop-shaped container 1 and are sub-divided into three groups 4, 5 and 6 that are separated from one another by means of partitioning strips 8, 9 and 10. The partitioning strips, in this particular instance, are shown as being made up of some semipliable or flexible fabric material such as stiff perforated paraffin paper or the like. It will be observed that the strips 8, 9 and 10 completely surround the groups of comestibles on three sides and on the fourth side are provided with flat portions 11 and 12. The false end portion 3 is capable of being removed from the scoop-shaped container 1. It is perforated as shown in Fig. 2 so that when the container 1 is inserted into the freezing holder and then set on end or perpendicularly, the false bottom 3 will be disposed at the bottom of the holder. After the fish have been arranged within the container as shown in Fig. 1, this container is then inserted into a holder which may be a freezer can such as is described in patent mentioned above. The handle 2 will be exposed, rendering the scoop-shaped container 1 readily accessible whereby the container may be withdrawn from the freezer can before or after freezing. After the comestibles have been refrigerated and frozen en masse into one solid mold in which the partitioning strips 8, 9 and 10 are contained in situ, they are removed from the holder. The comestibles will be frozen into a single solid mold which may be handled as a unit.

When it is desired to subdivide the mold into several cakes or packs, of regular form, a slight force only is required to separate the groups 4, 5 and 6 along lines coincident with the partitioning strips 8, 9 and 10 that were interposed during the packing of the comestibles. In this manner, the frozen mold may be subdivided into smaller packs or cakes without bruising, scarring or mutilating the comestibles.

It is to be understood in connection with Fig. 1 that the partitioning strips 8, 9 and 10 may be substituted by the partitioning strips of Figs. 4 and 5, the partitioning strips of Figs. 6, 7 and 8 or by the partitioning strips of Figs. 9, 11 and 10.

Referring to Fig. 2, a scoop-shaped container 13 provided with an elongated handle 14 is associated with a partitioning framework comprising end members 15 and 16 and longitudinal partitioning strips 18 and 19, such as are illustrated in Figs. 4 and 5 or Fig. 9. The partitioning frame-work is disposed upon the flat surface of the scoop 13 and the comestibles are then closely packed into the several compartments thus provided. By reason of the openings 20 and 21 which extend longitudinally of the partitioning strips 18 and 19, respectively, the comestibles of adjacent compartments are brought into direct contact with one another. The removable end member 22 constitutes a closure member for the partitioning frame-work of the scoop 13. When the comestibles are arranged into the several compartments, the scoop 13 is then inserted in a freezing holder of the usual type of construction which, in turn, is disposed vertically in a refrigerating bath. Before or after the comestibles have been frozen en masse into a single mold comprising the partitioning frame-work, the scoop 13 may be withdrawn from the holder. It is apparent that the mold will be frozen solidly in a single unit, but, nevertheless, may be sub-divided into three separate cakes or packs of regular form by reason of the partitioning strips 18 and 19 and the frame-work.

The partitioning frame-work illustrated in Fig. 2, while showing partitioning strips similar to those illustrated in Figs. 4 and 5, may likewise comprise partitioning strips of the form illustrated in Figs. 6, 7 and 8 or Fig. 9, or Fig. 10. The end pieces 15 and 16 may be permanently secured to the partitioning strips or may be detached therefrom when the scoop 13 is inserted into the freezing holder. When comestibles are contained in a vertically disposed and watertight freezing can, it will be observed that there are a plurality of superimposed groups of comestibles that are separated from each other by means of partitioning strips. These partitioning strips, in the event that they are made of sufficiently rigid material, preclude the comestibles such as fish from unduly sagging, which condition sometimes obtains when the fish are packed tightly one above the other without the use of such partitioning strips. In this circumstance, the fish will form a frozen mold having a bulging central portion. By employing the partitioning strips such as we have described, the frozen mold, as well as the subdivided cakes, possesses a more regular form.

In Fig. 3 we have shown a container 23 that is divided by transverse partition strips 25 and longitudinal partition strips 26 into a series of separate compartments 24 to form a large number of separate cakes in the event that such subdivision of a frozen mold is desired. The partitioning frame-work of Fig. 3 is especially adapted for refrigerating berries and the like and each of the separate compartments 24 may contain a basket of the usual conformation in which the berries or other comestibles have been tightly packed. After the frozen mold, comprising the partitioning frame-work, is removed from the freezing holder or freezing can, the comestibles contained within the several compartments 24 may be readily removed therefrom.

Referring to Figs. 4 and 5, a partitioning strip is illustrated comprising two longitudinal and superposed members 27 and 28 that are spaced from one another by means of spacers 29. The partitioning strips 27 and 28 are provided at their opposed and adjacent edges with knife blade contours as shown in Fig. 5. These wedge-shaped strips 27 and 28 are received in recesses formed in the spacers 29. In this manner, the partitioning strips, such as illustrated in Fig. 4, may be readily assembled and placed in position when the scoop container is being packed. In Fig. 2 the sides of the partitions adjacent to the inner group of comestibles are not tapered so that the inner mold when refrigerated may be readily withdrawn from the frame-work.

In Fig. 6 we have illustrated a partitioning strip 30 which is provided with a plurality of longitudinally spaced elongated holes 31. Through the medium of the holes 31, the comestibles contained in adjacent compartments are brought into direct contact with each other. The partitioning strips 30 may possess a doubly concave contour as shown in Fig. 7 or be made of a thin sheet metal wood or cardboard strip of uniform thickness as shown in Fig. 8.

The partitioning strips 25 and 26 of Fig. 3 may be substituted by the partitioning strips 32 of Fig. 9 or by the partitioning strips 33 of Fig. 10. It is to be observed in Figs. 9 and 10 that the lower portions of the partitioning strips are considerably broader than the upper portions thereof. In employing the partitioning strips of Figs. 9 and 10, in the manner illustrated, the broad portions of these partitioning strips are to be placed preferably in contact with the bottom of the container in which the comestibles are initially packed. By making the partitioning strips of greater width at their bottom, comestibles may be placed in tapering packages which are then severally received in the separate groups or compartments formed in the container. This permits the frozen comestibles to be quickly withdrawn in groups of predetermined size from the partitioning frame-work after the refrigerating operation has been performed.

In Fig. 11 a partitioning strip 34 is illustrated which may be substituted for the strips of Figs. 4 or 6. The upper and lower edges of the strip 34 are undulating which permits of the fish in adjacent compartments or cakes or packs to come into physical contact with one another thereby freezing them en masse into a single subdivisible mold.

It will be apparent from the foregoing description of our invention that the comestibles contained within a single freezing holder, or the like, may be frozen en masse into one single mold in which loose spacers or fixed spacers or partitioning strips, as desired, have been inserted during the packing and arranging of the comestibles in order to partition them off into a plurality of groups of regular form. The partitions separating the mold of comestibles into groups are preferably perforated in order that comestibles of adjacent groups may come into physical or direct contact with one another in order to freeze through or around the partitioning members. After the refrigerating operation has been completed, the mold may be withdrawn from the holder and then, by exerting a slight force, the mold will readily and completely subdivide into regularly formed cakes along the partitioning strips. It will be obvious, of course, that if the comestibles are to be handled for any considerable time after being refrigerated or packed for cold storage, it will be advisable to retain them in the form of a single large mold. This is the most convenient procedure for handling in large quantities since the molds are capable of being subsquently divided with little effort into separate cakes or packs.

While we have shown several embodiments of our invention, we desire that only such limitations shall be imposed thereupon as are set forth in the appended claims.

What we claim as new and desire to secure by Letters Patent of the U. S. is:—

1. The method of handling comestibles for refrigerating them en masse into a solid mold subdivisible into sections of predetermined dimensions which consists in arranging and retaining said comestibles in regular order and in separate groups in a scoop-shaped container by interposing partitioning members between said groups, and then refrigerating the packed comestibles to freeze said partitioning members in situ with the comestibles whereby the frozen mold may be subsequently subdivided into separate groups along lines coincident with said partitioning members.

2. The method of handling comestibles for refrigerating them en masse into a single subdivisible mold which consists in packing comestibles in a container and in separate groups by interposing partitioning members that allow the comestibles to come into intimate contact with one another, and then refrigerating the comestibles to form a frozen single mold comprising said partitioning members in situ and which is subsequently capable of being subdivided into separate groups.

3. As an article of manufacture a frozen mold of refrigerated comestibles comprising a plurality of groups of comestibles frozen en masse, said groups being separated from each other by partitioning members frozen in situ in said mold.

4. As an article of manufacture a frozen mold of comestibles comprising a plurality of groups of comestibles frozen en masse, said groups being separated from each other by means of thin partitioning members frozen in situ in said mold and that allow the comestibles of adjacent groups to be in intimate contact with one another.

5. As an article of manufacture a frozen mold of refrigerated comestibles comprising a plurality of groups of comestibles frozen en masse, said groups being separated from each other by partitioning members frozen in situ in said mold, said partitioning members extending over the major part of a cross sectional area of the mold but permitting a small part of the comestibles of one group to freeze in direct contact with a small part of the comestibles of another group, whereby the groups may be retained together until deliberate separation thereof.

In witness whereof, we have hereunto subscribed our names.

CLIFFORD J. THOMPSON.
PAUL W. PETERSEN.